United States Patent
Yamada et al.

(10) Patent No.: US 9,886,777 B2
(45) Date of Patent: Feb. 6, 2018

(54) IMAGE PROCESSING APPARATUS AND IMAGE PROCESSING METHOD

(71) Applicant: FUJI XEROX CO., LTD., Tokyo (JP)

(72) Inventors: Kazuo Yamada, Kanagawa (JP); Mitsuyuki Tamatani, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 92 days.

(21) Appl. No.: 15/042,269

(22) Filed: Feb. 12, 2016

(65) Prior Publication Data

US 2017/0084054 A1    Mar. 23, 2017

(30) Foreign Application Priority Data

Sep. 18, 2015   (JP) .................. 2015-184701

(51) Int. Cl.
 *G06K 9/36*   (2006.01)
 *G06T 9/00*   (2006.01)
(52) U.S. Cl.
 CPC ..................... *G06T 9/00* (2013.01)
(58) Field of Classification Search
 CPC . G06K 9/00; G06T 9/00; H04N 19/93; H04N 19/94
 USPC .......................... 382/232, 233, 239
 See application file for complete search history.

(56) References Cited

U.S. PATENT DOCUMENTS

| | | | |
|---|---|---|---|
| 6,539,120 B1 * | 3/2003 | Sita ............ | G06T 1/60 |
| | | | 348/E5.108 |
| 8,995,017 B2 * | 3/2015 | Ikegami .......... | H04N 1/3877 |
| | | | 358/1.9 |
| 2010/0322512 A1 * | 12/2010 | Huang ............ | H04N 19/186 |
| | | | 382/166 |

FOREIGN PATENT DOCUMENTS

JP    2008-312107 A    12/2008

* cited by examiner

*Primary Examiner* — Daniel Mariam
(74) *Attorney, Agent, or Firm* — Sughrue Mion, PLLC

(57) ABSTRACT

An image processing apparatus includes a determiner that determines an array state of plural pixels to be collectively processed with a processing frame being a processing unit of image processing; and a matching unit that causes the plural pixels of image data to be in a data format matching with the processing frame by correction in accordance with the array state.

5 Claims, 10 Drawing Sheets

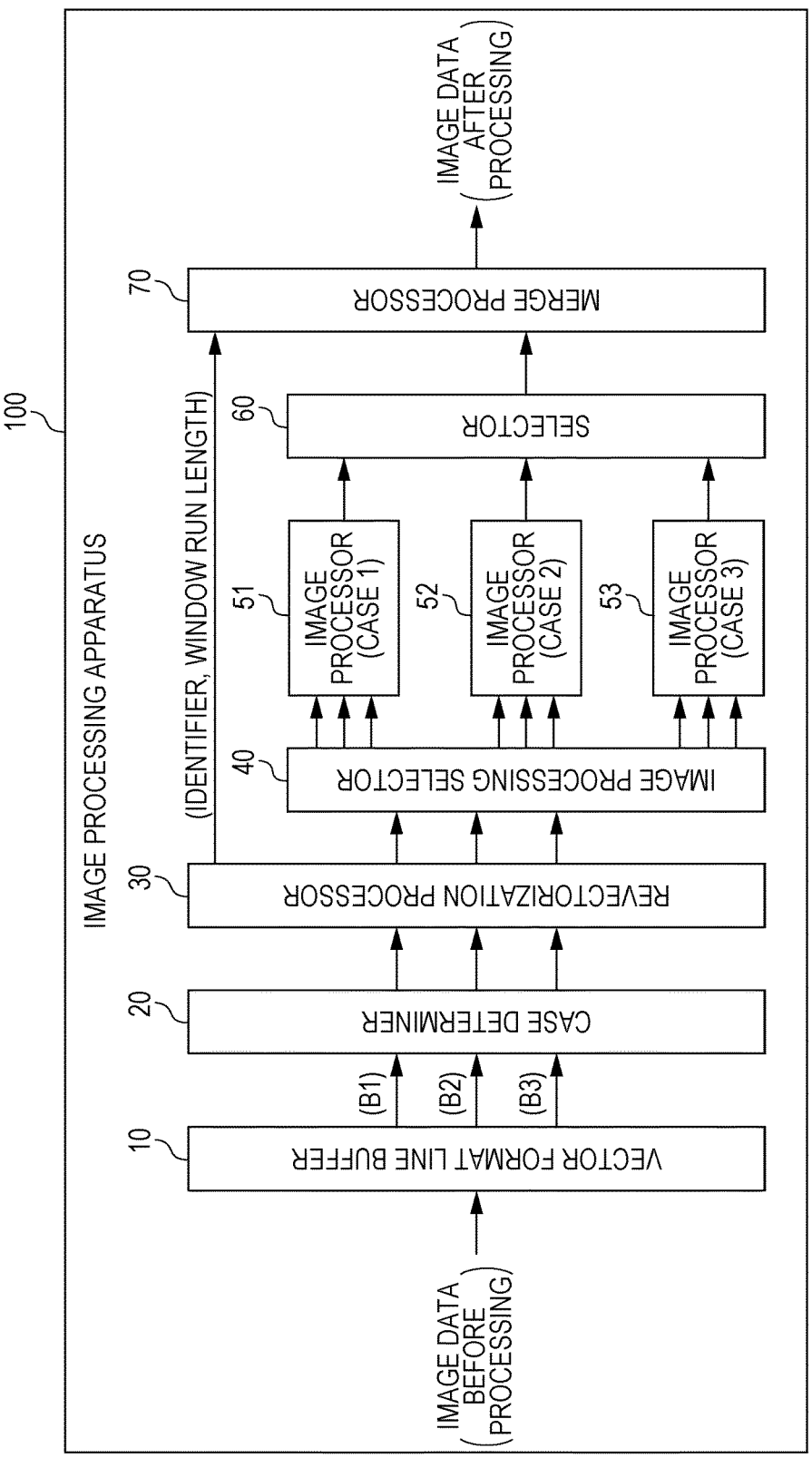

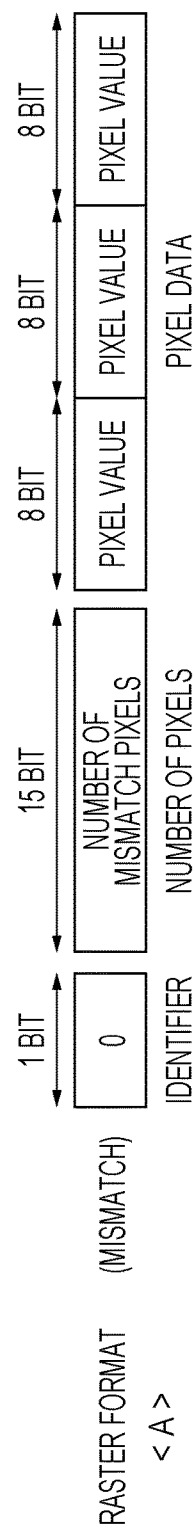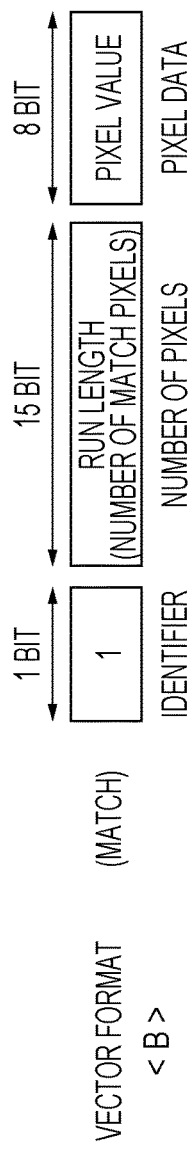

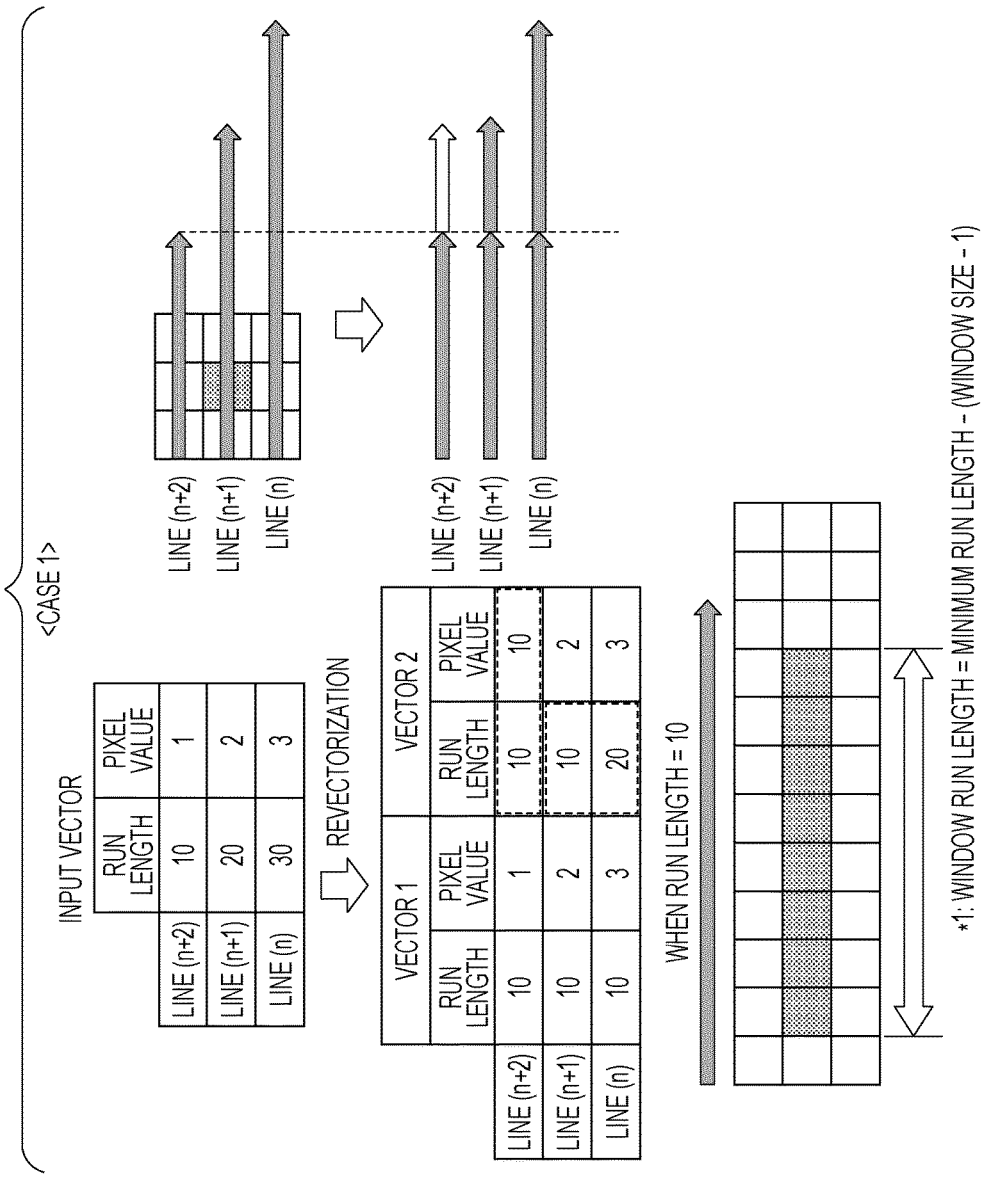

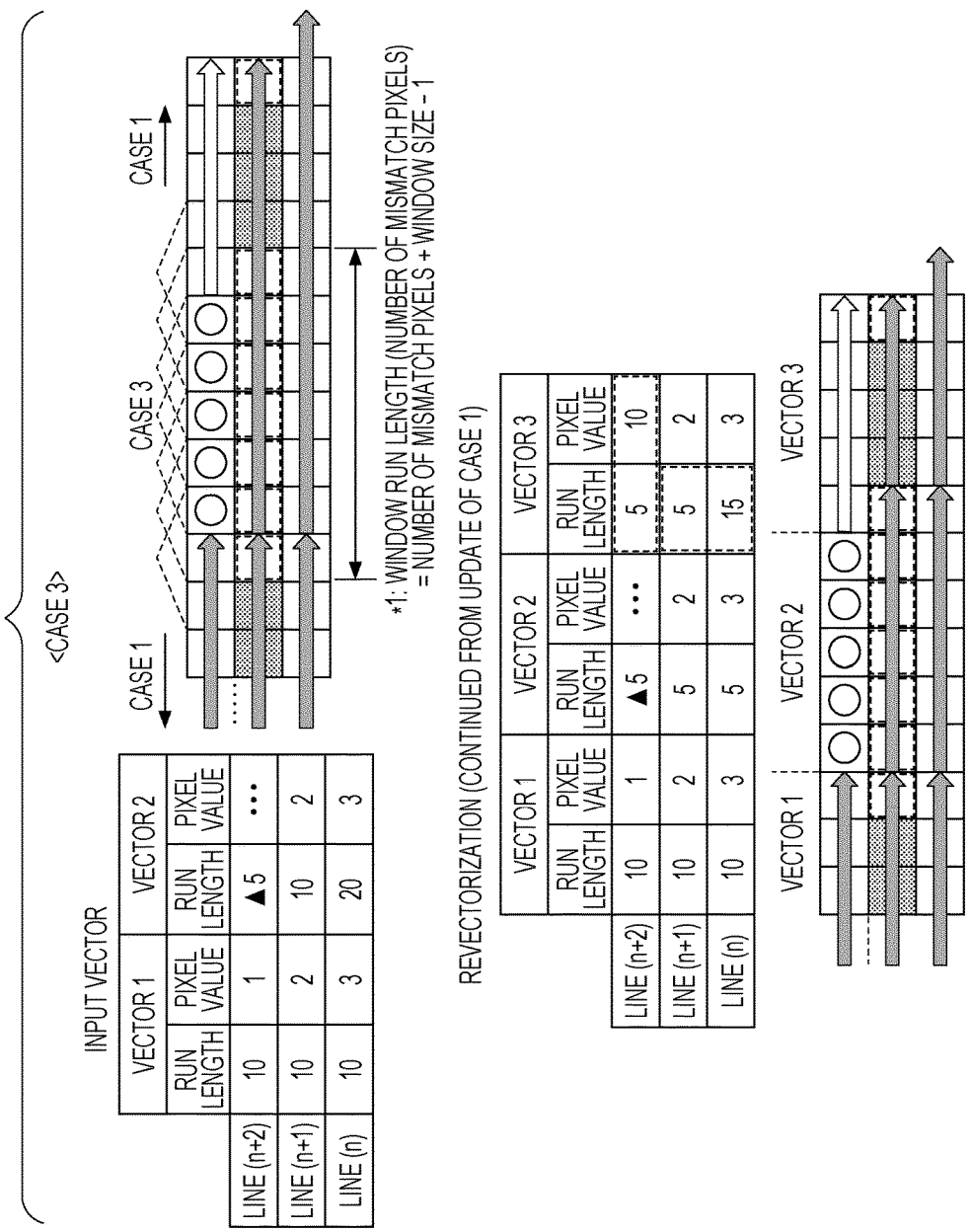

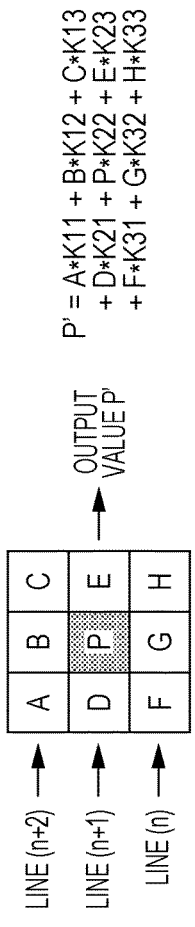
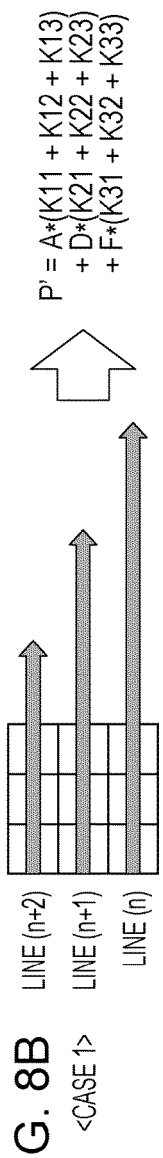
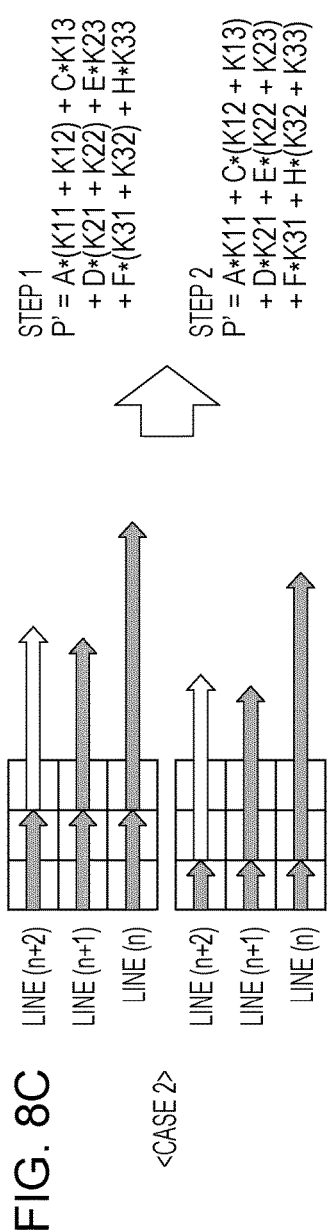
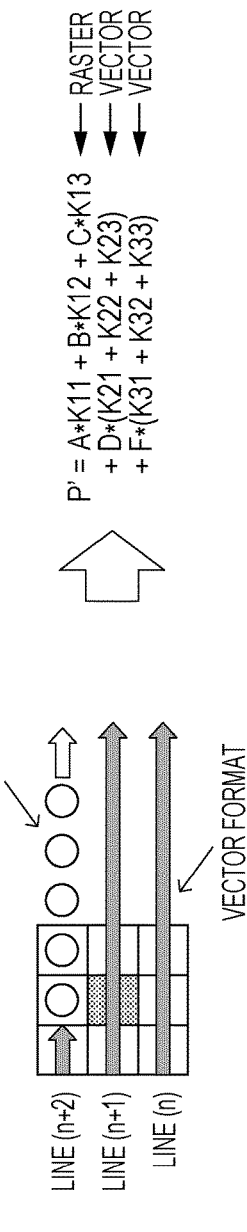
FIG. 8A <BASIC PROCESSING>
FIG. 8B <CASE 1>
FIG. 8C <CASE 2>
FIG. 8D <CASE 3>

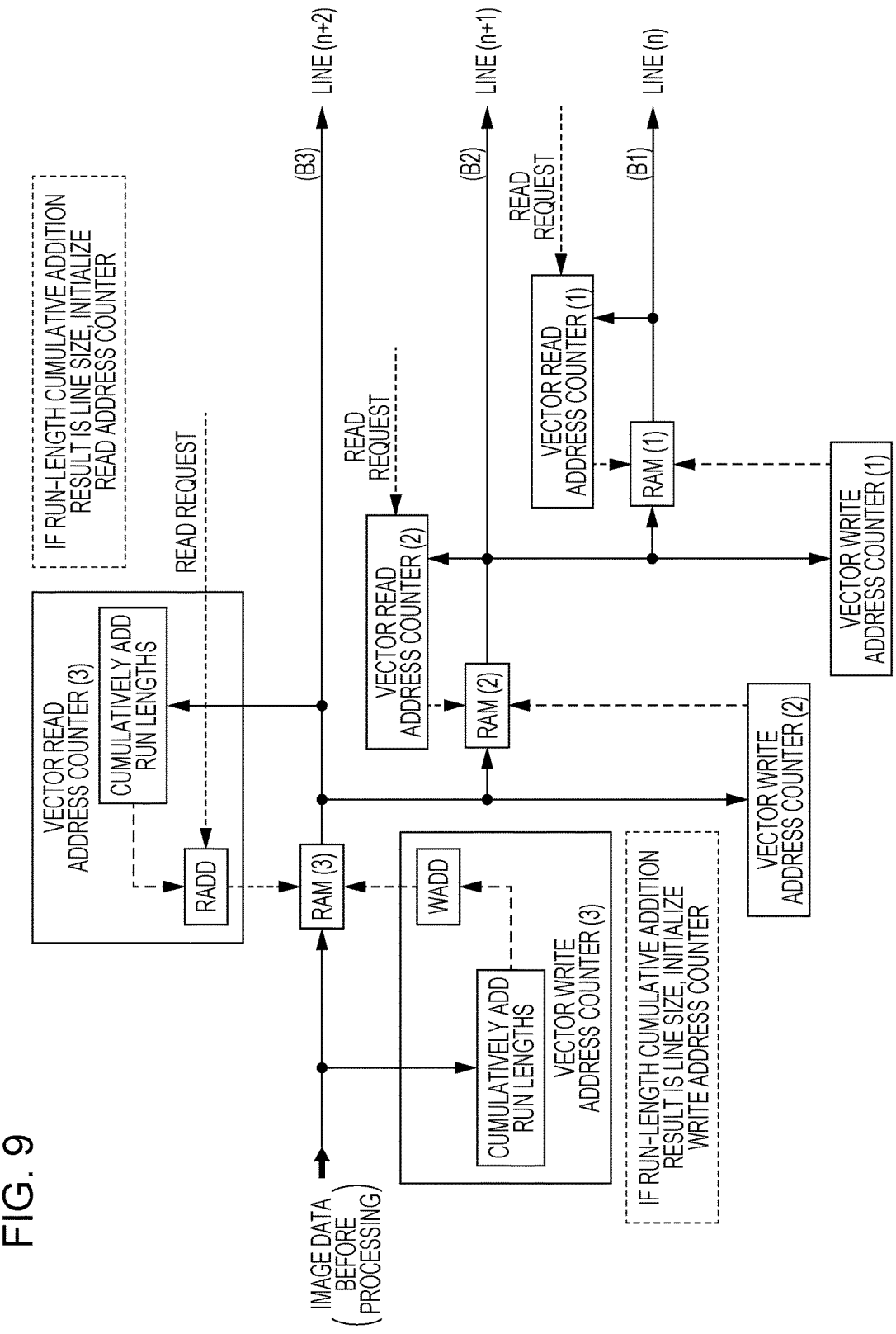

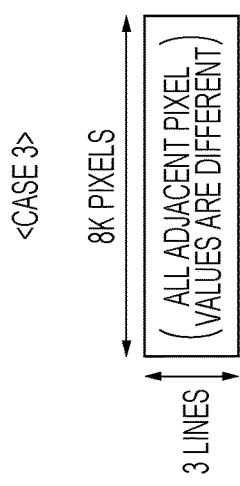

FIG. 10A

<CASE 1>

8K PIXELS

ALL PIXEL VALUES ARE SAME

3 LINES (1 CLK PER 1 PIXEL)

- NORMAL WINDOW PROCESSING
  8K*3 LINES = 24 KCLK

- EXEMPLARY EMBODIMENT
  (VECTOR FORMAT)
  1 PIXEL*3 LINES = 3 CLK
  EFFECT = 24K/3
  = 8000 TIMES HIGH-SPEED

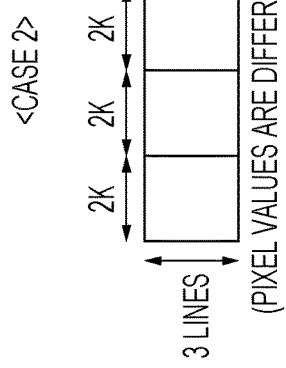

FIG. 10B

<CASE 2>

2K  2K  2K  2K

3 LINES (PIXEL VALUES ARE DIFFERENT EVERY 2K)

(1 CLK PER 1 PIXEL)

- NORMAL WINDOW PROCESSING
  8K*3 LINES = 24 KCLK

- EXEMPLARY EMBODIMENT
  (VECTOR FORMAT)
  12 PIXELS*3 LINES = 36 CLK
  EFFECT = 24K/36
  = 667 TIMES HIGH-SPEED

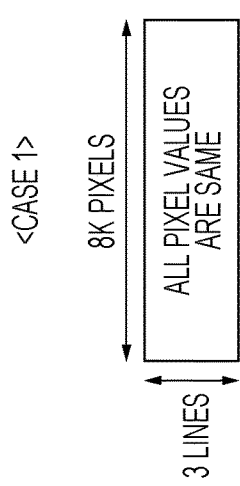

FIG. 10C

<CASE 3>

8K PIXELS (ALL ADJACENT PIXEL VALUES ARE DIFFERENT)

3 LINES (1 CLK PER 1 PIXEL)

- NORMAL WINDOW PROCESSING
  8K*3 LINES = 24 KCLK

- EXEMPLARY EMBODIMENT
  (VECTOR FORMAT)
  8K*3 LINES = 24 KCLK
  EFFECT = SAME

IMAGE PROCESSING APPARATUS AND IMAGE PROCESSING METHOD

CROSS-REFERENCE TO RELATED APPLICATIONS

This application is based on and claims priority under 35 USC 119 from Japanese Patent Application No. 2015-184701 filed Sep. 18, 2015.

BACKGROUND (i) Technical Field

The present invention relates to an image processing apparatus and an image processing method.

(ii) Related Art

There is widely known an image processing apparatus that executes image processing on image data. The image data is formed of plural pixels in a data format, such as a raster format or a vector format. Also, as image processing, for example, in addition to processing capable of obtaining an output value from only a target pixel being a processing object, window processing is known. The window processing obtains an output value of a target pixel by using plural pixels around the target pixel.

SUMMARY

According to an aspect of the invention, there is provided an image processing apparatus including a determiner that determines an array state of plural pixels to be collectively processed with a processing frame being a processing unit of image processing; and a matching unit that causes the plural pixels of image data to be in a data format matching with the processing frame by correction in accordance with the array state.

BRIEF DESCRIPTION OF THE DRAWINGS

An exemplary embodiment of the present invention will be described in detail based on the following figures, wherein:

FIG. 1 illustrates a specific example of an image processing apparatus desirable for an exemplary embodiment of the present invention;

FIGS. 2A and 2B are illustrations for describing data formats of image data;

FIGS. 5A and 5B are illustrations for describing revectorization in a case 1;

FIGS. 7A and 7B are illustrations for describing revectorization in a case 3;

FIGS. 8A to 8D are illustrations for describing window processing depending on respective cases;

FIG. 9 illustrates an inner configuration example of a vector format line buffer; and FIGS. 10A to 10C illustrate specific examples of effects obtained by the exemplary embodiment.

DETAILED DESCRIPTION

Figure 3A:
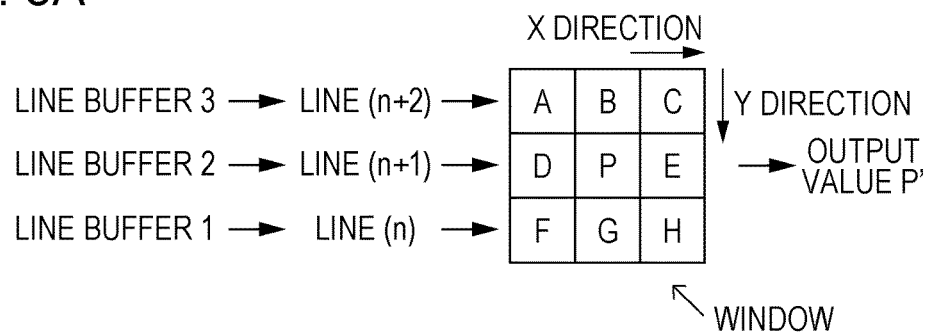
FIGS. 3A to 3C are illustrations for describing window processing.

FIG. 1 illustrates a specific example of an image processing apparatus 100 desirable for an exemplary embodiment for implementing the present invention. The image processing apparatus 100 in FIG. 1 executes image processing on image data (including data having only characters, numbers, and/or symbols).

The image processing apparatus 100 has, for example, an image reading function (a scanning function), and handles image data obtained from a medium such as paper through the image reading function, as a processing object. Also, an image corresponding to image data after image processing by the image processing apparatus 100 may be printed on a medium such as paper, or image data after image processing may be provided to an external device. Desirable specific examples of the image processing apparatus 100 include a copier, a printer, and a facsimile (FAX). Further, a multi-function apparatus having plural functions included in the copier, the printer, and the facsimile is also a specific example desirable for the image processing apparatus 100. Of course, the image processing apparatus 100 may execute image processing on image data obtained from an external device such as a computer.

FIG. 1 illustrates major inner configurations (plural blocks with reference signs applied) included in the image processing apparatus 100. The inner configurations shown in FIG. 1 may be provided by using various hardware. At least a portion of the inner configurations in FIG. 1 may be provided by using, for example, a dynamic reconfigurable processor (DRP) etc. Also, at least a portion of the inner configurations shown in FIG. 1 may be provided by using, for example, a programmable logic device (PLD), a field programmable gate array (FPGA), an application specific integrated circuit (ASIC), etc. The above-described hardware for providing the inner configurations of the image processing apparatus 100 is merely an example, and other hardware may be used. Further, at least a portion of the inner configurations of the image processing apparatus 100 may be provided by cooperation of hardware, such as a central processing unit (CPU) and a memory, and a program that determines the operations of the hardware.

FIGS. 2A and 2B are illustrations for describing data formats of image data. FIG. 2A illustrates a specific example of a raster format <A>, and FIG. 2B illustrates a specific example of a vector format <B>. These formats are data formats of image data on which image processing is executed by the image processing apparatus 100 in FIG. 1.

Each of the data formats shown in FIGS. 2A and 2B is formed of an identifier, the number of pixels, and pixel data. The identifier is 1-bit data indicative of whether the data format is the raster format "0" or the vector format "1." The number of pixels is 15-bit data indicative of the number of continuous plural pixels in the image data. The pixel data is formed of 8-bit data indicative of a pixel value of each pixel.

The raster format is a data format suitable for handling continuous plural pixels having different pixel values. The number of pixels in the raster format indicates the number of plural pixels having different pixel values (mismatch pixel values). Also, the pixel data in the raster format is formed of plural pixel values relating to plural pixels by a number indicated by the number of pixels.

In contrast, the vector format is a data format suitable for handling continuous plural pixels having the same pixel value. The number of pixels in the vector format indicates the number of plural pixels having the same pixel value (match pixel value). The number of pixels in the vector format is called run length. Also, the pixel data in the vector format is formed of the same pixel value (a single pixel value) relating to plural pixels by a number indicated by the number of pixels.

Image data (before processing) to be processed by the image processing apparatus 100 in FIG. 1 has data formats including the raster format and the vector format shown in FIGS. 2A and 2B. The image processing apparatus 100 executes the window processing on the image data.

Figure 3B:
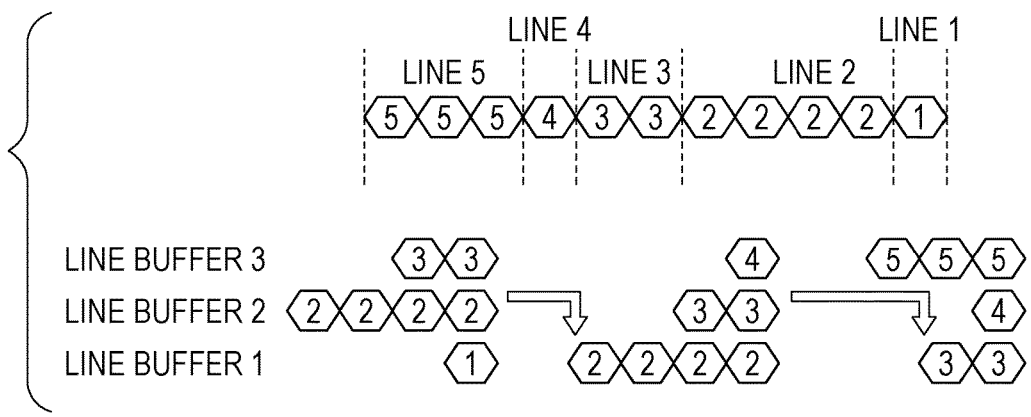
Figure 3C:
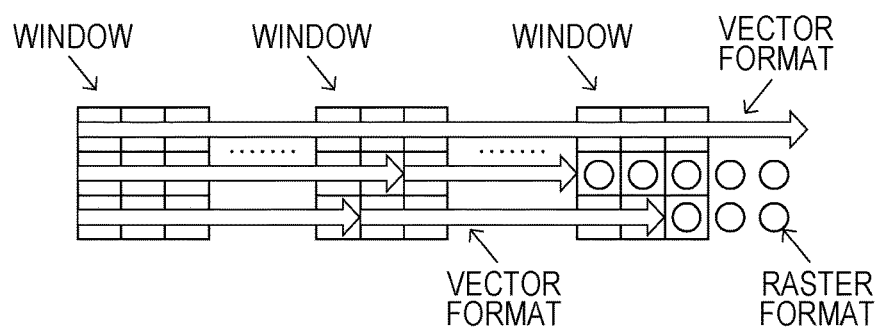

FIGS. 3A to 3C are illustrations for describing the window processing. A window in the window processing is a specific example of a processing frame serving as a processing unit of image processing.

FIG. 3A illustrates a 3×3 window as a specific example of a window. In the image processing with the window, an output value P' of a target pixel P is obtained by using plural pixels A to H around the target pixel P.

Image data is configured of plural lines. Each line is configured of plural pixels that are one-dimensionally arrayed. In FIG. 3A, a line direction (an array direction of the plural pixels in each line) of the image data is the X direction, and an array direction of the plural lines (a direction perpendicular to the line direction) is the Y direction. A processing object of the window in FIG. 3A is three pixels in the X direction and three pixels in the Y direction, that is, nine pixels in total.

For example, a processing object of the window in FIG. 3A is three pixels F, G, and H in a line n (n being a natural number), three pixels D, P, and E in a line (n+1), and three pixels A, B, and C in a line (n+2). The plural pixels corresponding to the three lines are output from line buffers 1 to 3.

FIG. 3B illustrates a specific example of processing in line buffers. In the line buffers 1 to 3, the plural pixels in the leading line 1 of the image data are stored first, and then the plural pixels in the following lines 2 and 3 are successively stored. Then, the stored plural pixels in the three lines are read from the line buffers 1 to 3 and used in later processing.

When the processing on the lines 1 to 3 is ended, plural pixels in lines 2 to 4 are stored in the line buffers 1 to 3. That is, the plural pixels in the line 2 are shifted from the line buffer 2 to the line buffer 1, the plural pixels in the line 3 are shifted from the line buffer 3 to the line buffer 2, and plural pixels in a line 4 are stored in the line buffer 3.

Further, when the processing on the lines 2 to 4 is ended, plural pixels in lines 3 to 5 are stored in the line buffers 1 to 3. That is, the plural pixels in the line 3 are shifted from the line buffer 2 to the line buffer 1, the plural pixels in the line 4 are shifted from the line buffer 3 to the line buffer 2, and plural pixels in a line 5 are stored in the line buffer 3.

In this way, plural pixels in plural lines configuring the image data are shifted in the line buffers 1 to 3 stepwise on a line basis.

However, if plural pixels in the vector format are included in each of the respective lines, the numbers of vectors (the numbers of pieces of data in the vector format) in the respective lines may differ from one another. Hence, a vector format line buffer 10 (FIG. 1) requires executing the shift processing in the line buffers 1 to 3 with regard to the numbers of vectors in the respective lines. A specific example of the vector format line buffer 10 is described later in detail with reference to FIG. 9.

Also, if plural pixels in the vector format are included in each of the respective lines, since the numbers of pixels (run lengths) in the vector format may differ from one another on a vector basis, for example, as shown in FIG. 3C, the data format of the plural pixels may not conform to the window size. Owing to this, the image processing apparatus 100 in FIG. 1 determines the array state of plural pixels to be collectively processed with the window, and revectorizes the plural pixels into a data format conforming to the window by correction in accordance with the array state.

Figure 4A:
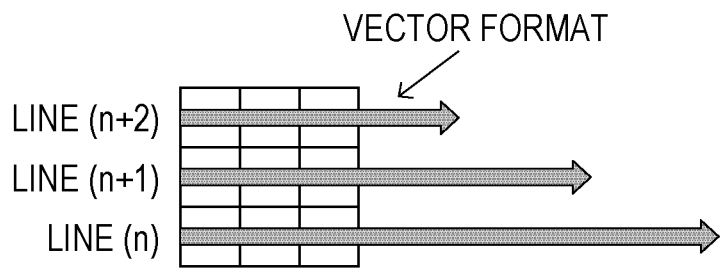
FIGS. 4A to 4C are illustrations for describing array states of plural pixels in windows.
Figure 4B:
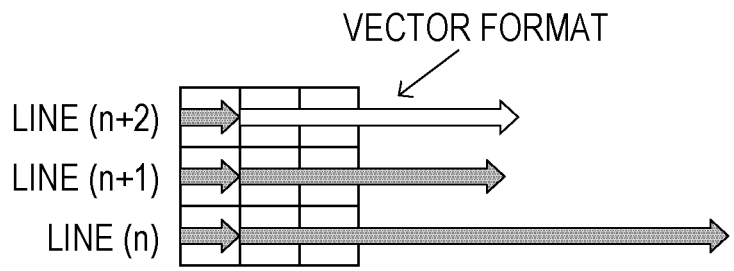
Figure 4C:
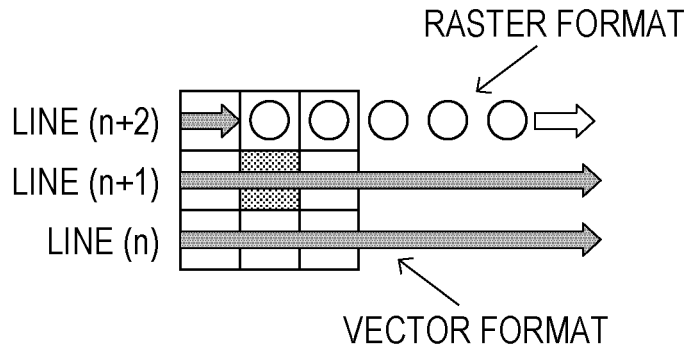

FIGS. 4A to 4C are illustrations for describing array states of plural pixels in windows. FIGS. 4A to 4C illustrate the array states of plural pixels, the array states each relating to three lines of a line n, a line (n+1), and a line (n+2) in a window. The array states are classified into array patterns of cases 1 to 3.

The case 1 (FIG. 4A) has an array pattern in which plural pixels in all three lines in the window are in the vector format, the run lengths of vectors are larger than the window size (corresponding to three pixels) in all three lines, and the vector format is constant in the window.

The case 2 (FIG. 4B) has an array pattern in which plural pixels in all three lines in the window are in the vector format, a vector in at least one line changes and the vector format changes in the window.

The case 3 (FIG. 4C) has an array pattern in which plural pixels in the raster format is included in at least one line in the window.

A case determiner 20 in FIG. 1 determines a case to which the array state of plural pixels relating to three lines obtained from three line buffers 1 to 3 (B1 to B3) in the vector format line buffer 10 corresponds, from among one of the cases 1 to 3. Then, a revectorization processor 30 revectorizes the plural pixels in the three lines into the data format conforming to the window by a correction pattern corresponding to the case determined by the case determiner 20, among correction patterns respectively defined for the cases 1 to 3.

FIGS. 5A and 5B are illustrations for describing revectorization in the case 1. In the case 1, the plural pixels in all three lines in the window are in the vector format, and the run lengths of the vectors in all three lines are equal to or larger than the window size (corresponding to three pixels). Hence, with reference to the line with the minimum run length of the vector (the input vector) among the three lines being a processing object of the window, the run lengths of the vectors in the other lines are corrected.

For example, as shown in the specific example shown in FIG. 5B, when the run length of the input vector in the line n is 30, the run length of the input vector in the line (n+1) is 20, and the run length of the input vector in the line (n+2) is 10, the input vectors in the line n and the line (n+1) are corrected to match with the run length of the input vector in the line (n+2) with the minimum run length. To be specific, as shown in FIG. 5B, the input vector with a run length being 30 and a pixel value being 3 in the line n is revectorized into a vector 1 with a run length being 10 and a pixel value being 3 and a vector 2 with a run length being 20 and a pixel value being 3, and the input vector with a run length being 20 and a pixel value being 2 in the line (n+1) is revectorized into a vector 1 with a run length being 10 and a pixel value being 2 and a vector 2 with a run length being 10 and a pixel value being 2. The input vector in the line (n+2) serves as a vector 1 without change, and the next input vector (NEXT vector) in the line (n+2) serves as a vector 2.

FIG. 5A shows a flowchart of revectorization processing in the case 1 executed by the revectorization processor 30 (FIG. 1). First, a minimum run length representing that the run length of a vector (an input vector) is the minimum is extracted from the three lines being the processing object of the window (S1), and the run lengths of the respective lines are matched with the minimum run length (S2).

Then, a run length of the window (a window run length) is calculated (S3). The window run length is a run length (the number of pixels) of an output value after image processing with the window, and is calculated by an expression as follows: window run length=minimum run length−(window size−1).

Also, sort for the later image processing is the case 1 (S4), the minimum run length and the identifiers and run lengths of all three lines are read (S5), and the run lengths relating to lines other than the line with the minimum run length are re-calculated (S6), and thus the input vectors are revectorized. For example, as shown in the specific example in FIG. 5B, an input vector is revectorized and divided into a vector 1 and a vector 2, and the revectorization processing is ended.

Figure 6A:
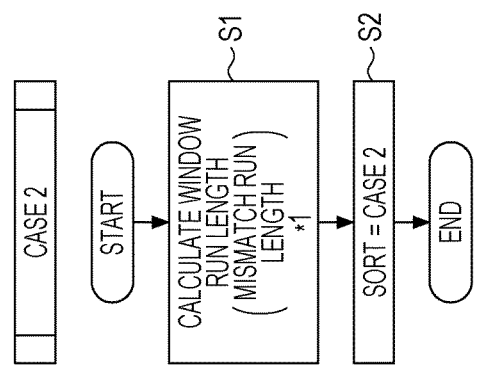
FIGS. 6A and 6B are illustrations for describing revectorization in a case 2.
Figure 6B:
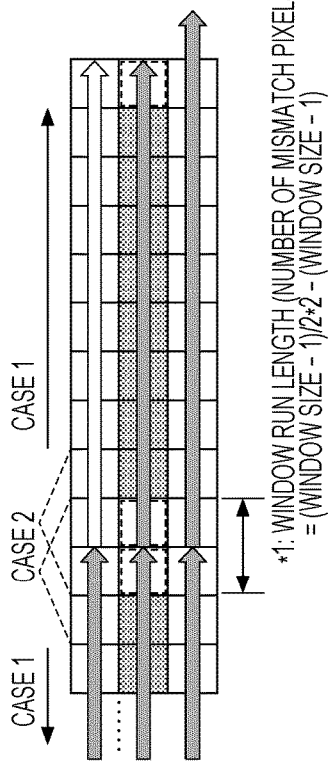

FIGS. 6A and 6B are illustrations for describing revectorization in the case 2. In the case 2, plural pixels in all three lines in the window are in the vector format, a vector in at least one line changes and the vector format changes in the window. In the case 2, a vector is not corrected (divided) by revectorization.

For example, referring to the specific example in FIG. 6B, the case 2 is determined when the input vectors in the line n, line (n+1), and line (n+2) are changed from vectors 1 to vectors 2 in the window.

FIG. 6A shows a flowchart of revectorization processing in the case 2 executed by the revectorization processor 30 (FIG. 1). In the case 2, the run length of the window (the window run length) is calculated (S1). The window run length is the run length (the number of pixels) of an output value after image processing with the window. In the case 2, the output value becomes the number of mismatch pixels. The window run length is calculated by an expression as follows: window run length=(window size−1).

Then, sort for the later image processing is the case 2 (S2), and the revectorization processing is ended without correcting the input vector.

FIGS. 7A and 7B are illustrations for describing revectorization in the case 3. In the case 3, plural pixels in the raster format is included in at least one line in the window. In the case 3, with reference to the run length in the raster format (the number of mismatch pixels) included in input vectors, the run lengths of vectors in the other lines are corrected.

For example, as shown in the specific example shown in FIG. 7B, if data in the raster format is included in the input vector in the line (n+2), that is, if the vector 2 in the line (n+2) is in the raster format, the input vectors in the line n and line (n+1) are corrected to have the same run length as the run length in the raster format (the number of mismatch pixels). To be specific, as shown in FIG. 7B, a vector 2 (run length: 20, pixel value: 3) being an input vector in the line n is revectorized into a vector 2 with a run length being 5 and a pixel value being 3 and a vector 3 with a run length being 15 and a pixel value being 3, and a vector 2 (run length: 10, pixel value: 2) being an input vector in the line (n+1) is revectorized into a vector 2 with a run length being 5 and a pixel value being 2 and a vector 3 with a run length being 5 and a pixel value being 2. A vector 2 being an input vector in the line (n+2) serves as a vector 2 continuously in the raster format without change, and the next input vector (NEXT vector) in the line (n+2) serves as a vector 3.

FIG. 7A shows a flowchart of revectorization processing in the case 3 executed by the revectorization processor 30 (FIG. 1). First, the number of mismatch pixels in the raster format included in the three lines being the processing object of the window is extracted (S1), and then the run length of the window (the window run length) is calculated (S2). The window run length is the run length (the number of pixels) of an output value after image processing with the window. In the case 3, the output value becomes the number of mismatch pixels. The window run length is calculated by the following expression. It is to be noted that the number of mismatch pixels in the right term of the following expression is the number of mismatch pixels in the raster format included in the input vector. The expression is as follows: window run length=number of mismatch pixels+window size−1.

Then, sort for the later image processing is the case 3 (S3), the identifiers and run lengths of the input vectors (including NEXT vector) in all three lines are read (S4), the run lengths of the vectors relating to lines other than the line including the raster format are re-calculated (S5), and thus the input vectors are revectorized. For example, as shown in the specific example in FIG. 7B, a vector 2 being an input vector is revectorized and divided into a vector 2 and a vector 3, and the revectorization processing is ended.

Image data revectorized by the revectorization processor 30 in FIG. 1 is transmitted to image processors 51 to 53 through an image processing selector 40. The image processing selector 40 transmits the revectorized image data to the image processor 51 in the case 1, transmits the revectorized image data to the image processor 52 in the case 2, and transmits the revectorized image data to the image processor 53 in the case 3. Then, the image processors 51 to 53 execute the image processing (the window processing) depending on the respective cases.

FIGS. 8A to 8D are illustrations for describing the window processing depending on the respective cases. FIGS. 8A to 8D illustrate examples of basic processing and processing for the respective cases (the cases 1 to 3) of image processing using a 3×3 window.

In the basic processing, the respective pixel values of nine pixels in the 3×3 window are multiplied by coefficients set in accordance with image positions in the window, the nine multiplied results obtained from the nine pixels are added, and an output value is obtained.

For example, referring to the specific example in FIG. 8A, a target pixel P and pixels A to H in a window are respectively multiplied by coefficients K11 to K33 corresponding to respective pixel positions, the nine multiplied results obtained from the nine pixels are added, and hence an output value P' is calculated.

In the case 1, the run lengths of vectors in all three lines in the window are equal to or larger than the window size (corresponding to three pixels), and three pixels in each line have the same pixel value in the window. The image processor 51 (FIG. 1) obtains the processing result corresponding to the basic processing by using the pixel value of one representative pixel in each line. For example, as shown in the specific example in FIG. 8B, an output value P' is calculated by using only one pixel per line, that is, a pixel A in a line (n+2), a pixel D in a line (n+1), and a pixel F in a line n.

In the case 2, the vector in at least one line changes and the vector format changes in the window. The image processor 52 (FIG. 1) obtains the processing result corresponding to the basic processing by using the pixel value of one representative pixel in each line among plural pixels belonging to the same vector in each line. In the case 2, as shown in the specific example in FIG. 8C, arithmetic expressions of STEP 1 and STEP 2 are used depending on the position of the window.

In the case 3, plural pixels in the raster format are included in at least one line in the window. Hence, the image processor 53 (FIG. 1) obtains a processing result corresponding to the basic processing by using respective pixel values of three pixels similarly to the basic processing for the line including the raster format, and by using the pixel value of one representative pixel among plural pixels belonging to the same vector in the line configured of the vector format. For example, as shown in the specific example in FIG. 8D, an output value P' is calculated by using the pixel values of pixels A to C in the line (n+2) including the raster format and by using the pixel values of the pixel D and the pixel F each being one representative pixel in the line (n+1) and the line n configured of the vector format.

The pieces of data with the image processing (the window processing) executed by the image processors 51 to 53 shown in FIG. 1 are transmitted to a merge processor 70 through a selector 60. Every time when the image processing (the window processing) is executed by the image processors 51 to 53, the selector 60 outputs data (the output values P') after image processing obtained from each of the image processors 51 to 53 which have executed the image processing to the merge processor 70.

The merge processor 70 forms image data after image processing by using the data after image processing obtained from each of the image processors 51 to 53 through the selector 60, and the identifier and window run length obtained from the revectorization processor 30.

For example, the merge processor 70 forms image data in a data format (the vector format in FIG. 2B) configured of an identifier, the number of pixels (=window run length=number of match pixels), and pixel data, by using the output value P' (see FIG. 8B) as the pixel value being the window processing result in the case 1 obtained from the image processor 51, and by using the identifier (vector "1") obtained from the revectorization processor 30 and the window run length (see FIG. 5B) in the case 1.

Also, for example, the merge processor 70 forms image data in a data format (the raster format in FIG. 2A) configured of an identifier, the number of pixels (=window run length=number of mismatch pixels), and pixel data, by using the output values P' in the respective steps (see FIG. 8C) as the pixel values being the window processing result in the case 2 obtained from the image processor 52, and by using the identifier (raster "0") obtained from the revectorization processor 30 and the window run length (see FIG. 6B) in the case 2.

For example, the merge processor 70 forms image data in a data format (the raster format in FIG. 2A) configured of an identifier, the number of pixels (=window run length=number of mismatch pixels), and pixel data, by using the output value P' (see FIG. 8D) as the pixel value being the window processing result in the case 3 obtained from the image processor 53, and by using the identifier (raster "0") obtained from the revectorization processor 30 and the window run length (see FIG. 7B) in the case 3.

In this way, the merge processor 70 forms image data after image processing (after window processing).

FIG. 9 illustrates an inner configuration example of the vector format line buffer 10 (FIG. 1). In a specific example shown in FIG. 9, the vector format line buffer 10 includes vector write address counters (1) to (3), vector read address counters (1) to (3), and random access memories (RAMs) (1) to (3).

Image data before processing (before window processing) is in data formats (FIGS. 2A and 2B) including the vector format and the raster format. The image data is input to the vector format line buffer 10 successively on a line basis in the order from the leading line of the image data.

The vector write address counters (1) to (3) control write of data in the RAMs (1) to (3) respectively corresponding to the vector write address counters (1) to (3). The vector write address counters (1) to (3) each cumulatively add the run length in a data format of plural pixels successively written in the RAM on a line basis, that is, the number of mismatch pixels in the raster format and the number of match pixels in the vector format, and initialize a write address counter (WADD) (set the count value at 0) when the cumulative sum of the run length (the number of pixels) reaches the line size (the number of pixels in one line). Accordingly, in the respective RAMS (1) to (3), data (data in the raster format and data in the vector format) on a line basis since the write address counter is initialized until next initialization is written.

In contrast, the vector read address counters (1) to (3) control read of data from the RAMs (1) to (3) respectively corresponding to the vector read address counters (1) to (3). The vector read address counters (1) to (3) each cumulatively add the run length in a data format of plural pixels successively read from the RAM on a line basis, that is, the number of mismatch pixels in the raster format and the number of match pixels in the vector format, and initialize a read address counter (RADD) (set the count value at 0) when the cumulative sum of the run length (the number of pixels) reaches the line size (the number of pixels in one line). Accordingly, data (data in the raster format and data in the vector format) on a line basis since the read address counter is initialized until next initialization is read from the respective RAMS (1) to (3).

The data successively input to the vector format line buffer 10 on a line basis in the order from the leading line of image data is shifted stepwise on a line basis to the line buffer 3 (B3), line buffer 2 (B2), and line buffer 1 (B1).

For example, in a state in which data in the line n is stored in the RAM (2) and data in the line (n+1) is stored in the RAM (3), if data in the line (n+2) is input to the vector format line buffer 10, the data in the line n stored in the RAM (2) is read and written in the RAM (1). Accordingly, the data in the line n is shifted. In parallel to the shift, the data in the line (n+1) stored in the RAM (3) is read and written in the RAM (2). Accordingly, the data in the line (n+1) is shifted.

Further, in parallel to the shift of the line n and the line (n+1), the data in the line (n+2) is written in the RAM (3). Consequently, the data in the line n is output from the line buffer 1 (B1) corresponding to the RAM (1), the data in the line (n+1) is output from the line buffer 2 (B2) corresponding to the RAM (2), and the data in the line (n+2) is output from the line buffer 3 (B3) corresponding to the RAM (3).

FIGS. 10A to 10C illustrate specific examples of effects obtained by this exemplary embodiment (the image processing apparatus 100 in FIG. 1). FIGS. 10A to 10C illustrate specific examples of effects in the cases 1 to 3 as compared with normal window processing.

The normal window processing is processing of applying window processing to each pixel of all pixels being a processing object. In each of the specific examples in FIGS. 10A to 10C, each line of three lines is configured of 8K pixels (8000 pixels). If window processing per pixel takes 1 clock (CLK), processing time is required by 1 CLK×8K pixels×3 lines=24K CLK.

In contrast, in the case 1, since all pixels in one line have the same pixel value, processing for only one pixel is executed per line, and processing time may be 1 CLK×1 pixel×3 lines=3 CLK. Accordingly, as compared with the normal window processing, the processing time becomes as fast as 24K/3=8000 times.

Also, if the pixel value changes (the vector changes) every 2K pixels in the case 2, processing for six pixels in STEP 1 and six pixels in STEP 2, that is, processing for twelve pixels in total is required (see FIG. 8C). Hence, the processing line of 1 CLK×12 pixels×3 lines=36 CLK is required. Accordingly, as compared with the normal window processing, the processing time becomes as fast as 24K/36=667 times.

In the case 3, if all the pixel values of the mutually adjacent pixels are different from one another, the window processing is required to be applied every pixel of all pixels. Similarly to the normal window processing, the processing time of 1 CLK×8K pixels×3 lines=24K CLK is required. As described above, even if all the pixel values of the mutually adjacent pixels are different from one another, the processing time is the same as that of the normal window processing.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   at least one of a programmable logic device (PLD), a field programmable gate array (FPGA), an application specific integrated circuit (ASIC), and a processor, configured to execute:
      a determiner that determines an array state of a plurality of pixels to be collectively processed with a processing frame being a processing unit of image processing; and
      a matching unit that causes the plurality of pixels of image data to be in a data format matching with the processing frame by correction using a correction pattern corresponding to the determined array state,
   wherein the determiner determines a case to which the array state of the plurality of pixels to be collectively processed with the processing frame corresponds, the case being one of a plurality of cases including a first case in which the data format of the plurality of pixels includes only the vector format and the vector format is constant in the processing frame, a second case in which the data format of the plurality of pixels includes only the vector format and the vector format is changed in the processing frame, and a third case in which the data format of the plurality of pixels includes a raster format, and
   wherein the matching unit causes the plurality of pixels to be in the data format matching with the processing frame by a correction pattern corresponding to the determined case among correction patterns respectively defined for the plurality of cases.

2. The image processing apparatus according to claim 1, wherein the matching unit revectorizes a vector format included in the data format of the plurality of pixels to be a vector format matching with the processing frame.

3. The image processing apparatus according to claim 2, further comprising a processor that executes the image processing by applying the plurality of pixels in the revectorized vector format to the processing frame with the vector format kept unchanged.

4. The image processing apparatus according to claim 1, wherein the processing frame includes a plurality of lines, each of the plurality of lines includes a number of pixels in a data format included in the plurality of pixels to be collectively processed with the processing frame, and the matching unit corrects the data formats of the plurality of lines so that the numbers of pixels of the plurality of lines are equivalent to each other.

5. An image processing method comprising:
   determining an array state of a plurality of pixels to be collectively processed with a processing frame being a processing unit of image processing; and
   causing the plurality of pixels of image data to be in a data format matching with the processing frame by correction using a correction pattern corresponding to the determined array state,
   wherein the determining determines a case to which the array state of the plurality of pixels to be collectively processed with the processing frame corresponds, the case being one of a plurality of cases including a first case in which the data format of the plurality of pixels includes only the vector format and the vector format is constant in the processing frame, a second case in which the data format of the plurality of pixels includes only the vector format and the vector format is changed in the processing frame, and a third case in which the data format of the plurality of pixels includes a raster format, and
   wherein the causing causes the plurality of pixels to be in the data format matching with the processing frame by a correction pattern corresponding to the determined case among correction patterns respectively defined for the plurality of cases.

* * * * *